Figure 1:
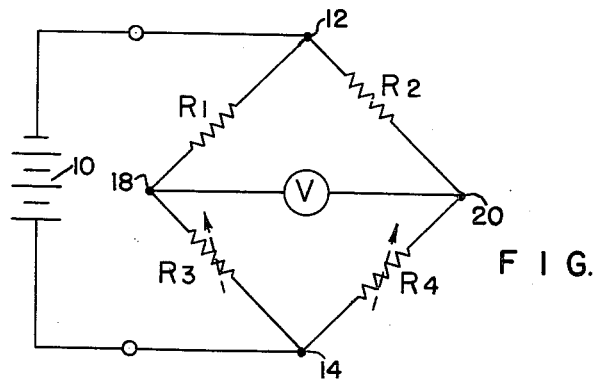

Dec. 18, 1962    R. J. FERRAN ET AL    3,068,693
MASS FLOW METER
Filed Sept. 22, 1958

INVENTORS
ROBERT J. FERRAN
EDWARD C. BRAINARD II
BY
Blair, Spencer & Buckles
ATTORNEYS United States Patent Office 3,068,693
Patented Dec. 18, 1962

3,068,693
MASS FLOW METER
Robert J. Ferran, Framingham, and Edward C. Brainard II, North Andover, Mass., assignors to Trans-Sonics, Inc., Lexington, Mass.
Filed Sept. 22, 1958, Ser. No. 762,431
12 Claims. (Cl. 73—204)

This invention relates to an improved mass flow meter particularly adapted for measuring the mass of fluid passing through a pipe or conduit per unit time. The meter utilizes a heated resistance wire cooled by the fluid being measured and a second unheated resistance wire, also exposed to such fluid, compensates for variations in the temperature thereof.

The measurement of mass, i.e. quantity as opposed to volume, flow of a material is desirable in various applications. In many continuously running chemical reactions it is desirable to supply ingredients in stoichiometric proportions and, therefore, the mass flow rate of the reagents must be measured and controlled. In many air conditioning and ventilating systems the mass or quantity of air supplied must be kept above a certain level for the safety of the occupants of the ventilated area; within this limit, it should be maintained as low as possible to provide economical operation of the system. This problem is particularly acute in high altitude passenger-carrying aircraft where a relatively large number of people are enclosed in a relatively small cabin space. Air from the atmosphere must be compressed, brought to the right temperature and then introduced into the cabin in sufficient amount to maintain passenger safety. The air conditioning equipment is, of course, subject to stringent weight restrictions and this imposes a limit on the capacity of the system. Consequently, it is necessary to provide an indication of insufficient air mass flow so that proper precautionary and corrective measures, such as descent to low altitude, may be undertaken in such circumstances.

Prior to our invention, mass flow measurement was often effected by the use of volume flow meters. Where the density of the measured material remains constant, a simple computation relates mass flow to volume flow and, in fact, such meters may be calibrated directly in terms of mass flow units. Thus volume flow meters are often suitable for measurement of mass flow of liquids. However, where a gas such as air is involved, density may undergo wide variations in response to temperature and pressure excursions. Except in a few instances where pressure and temperature are carefully controlled, volume flow meters are therefore unsuitable.

Direct measurement of mass flow has been accomplished with some degree of success by the use of hot wire anemometers. These instruments utilize electrically heated temperature-sensitive resistance wires exposed to the fluid stream. The quantity of heat withdrawn from such a wire by the moving fluid is dependent upon the mass flow rate of the fluid over the wire and the difference in temperature between the wire and the fluid. Hot wire anemometers may be operated with the heated probe wire maintained at constant temperature (and resistance) or with a constant current through the wire.

The constant temperature instruments incorporate the hot wire in a bridge circuit whose unbalance voltage is amplified and fed back to the input of the bridge. The output current of the amplifier is a function of the electrical energy applied to the hot wire and the latter is equal to the heat energy transferred from the wire to the moving fluid. Measurement of the output current thus provides an indication of the mass flow rate of the fluid. Such an instrument requires a high degree of stability in the amplifier as well as the various supply voltages. Moreover, since it utilizes a vacuum tube or transistor amplifier, reliability may be a serious problem where it is desired to leave the instrument unattended in an inaccessible location, particularly where human safety is involved. Therefore, the use of constant temperature anemometers has been largely limited to the laboratory.

The constant current hot wire anemometer, as the name implies, passes a constant current through the hot wire, and the voltage across this wire is proportional to the resistance and the temperature thereof. Since the temperature is a function of mass flow, the voltage across the wire is determinative of this quantity. Generally, constant current instruments have also incorporated amplification and feedback circuits to maintain desired circuit conditions, with the attendant disadvantages of such construction. Moreover, the heat flow from the wire and the temperature thereof are also dependent on the temperature of the monitored fluid. The voltage across the wire will thus also be dependent on this parameter. This poses no problem where the temperature of the fluid is carefully controlled. However, where the temperature varies, the output of the instrument must be compensated therefor, and automatically if the meter is to be of any practical use in the field. Such compensation has heretofore posed a serious problem, particularly in constant current anemometers, and these instruments have consequently found but limited application.

Accordingly, it is a principal object of our invention to provide an improved mass flow measuring instrument capable of determining the quantity of a fluid flowing thereby per unit time. Another object of our invention is to provide an instrument of the above character capable of determining the mass flow rate of a fluid through a pipe or conduit. A further object of our invention is to provide an instrument of the above character capable of direct mass flow readings and thus not requiring external computation for variations in fluid density. Yet another object of our invention is to provide an instrument of the above character which automatically compensates for changes in the temperature of the fluid. A further object of our invention is to provide a mass flow meter of the above character which is simple in construction and reliable in operation under field conditions. Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

Figure 2:
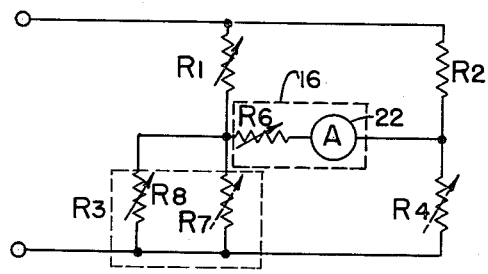
Figure 3:
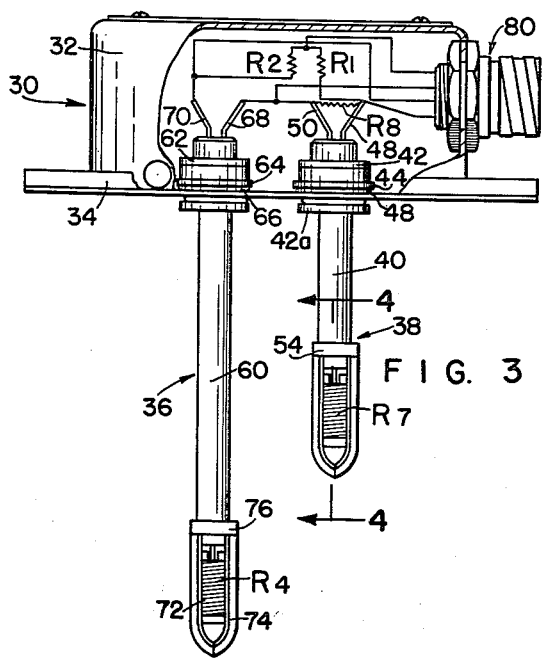
Figure 4:
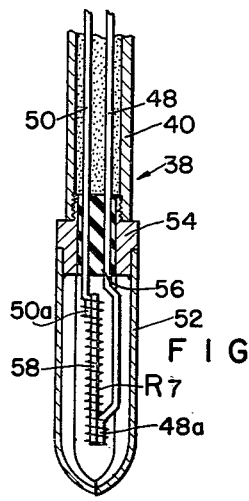

For a fuller understanding of the nature and objects of the invention, reference should be had to the following detailed description taken in connection with the accompanying drawing in which:

FIGURE 1 is a simplified schematic diagram of a mass flow measuring instrument embodying the principles of our invention, FIGURE 2 is a schematic diagram of a mass flow instrument made according to our invention and adapted for measurement of the mass flow rate of air through a conduit, FIGURE 3 is a fragmentary sectional view of a probe adapted for use with the circuit of FIGURE 2, and FIGURE 4 is a fragmentary enlarged view showing a probe wire in its probe mounting arrangement as shown in FIGURE 3.

Our mass flow meter is a constant current, hot wire, anemometer type instrument with automatic compensation for changes in temperature of the metered fluid. A heated, temperature-sensitive, resistance wire exposed to the moving fluid is incorporated in one arm of a bridge circuit. An adjacent arm has an unheated resistance wire also exposed to the fluid stream. The resistance of the heated wire is, as pointed out above, a function of the mass flow past it and the temperature of the fluid. The temperature of the unheated wire approximates that of the fluid and, therefore, its resistance is a function only of fluid temperature. We have derived a set of circuit parameters which afford compensation of fluid temperature-caused changes in the resistance of the heated wire by corresponding changes in the resistance of the unheated wire in such manner that the unbalance voltage of the bridge is essentially independent of the temperature of the fluid over the operating range of the instrument.

Turning now to FIGURE 1, a bridge circuit constructed in accordance with out invention has a pair of fixed resistors R1 and R2 connected in series with temperature sensitive resistors R3 and R4 and a source of electrical potential illustratively indicated by the battery 10, the latter being connected to bridge input terminals 12 and 14. Resistors R3 and R4 are exposed to the monitored fluid stream in a manner to be described and the difference in voltages across these two resistors is indicated by a voltmeter 16 connected to output terminals 18 and 20. The resistance of resistor R2 is sufficiently greater than resistor R4 to maintain an essentially constant current through the latter over the range of resistance variations which may be encountered in operation of the instrument. Moreover, the total resistance of the series combination of resistors R2 and R4 is low enough to permit sufficient current to heat resistor R4 to a desirable operating temperature.

We have found that with battery 10 supplying approximately 18 volts, resistors R2 and R4 should be, respectively, 72 and 9 ohms to meet the above conditions. The preferred resistances of resistors R1 and R3 are derived as indicated below. It will be noted, at this point, however, that the current through resistor R3 should be such as to cause negligible heating.

More particularly, the heat flow from the heated probe is given by $$q = UA(T_w - T_a) \quad (1)$$

where:
U is a heat transfer coefficient roughly proportional to the square root of mass flow and dependent to a much lesser extent on the temperature of the fluid,
A is the exposed area of the probe; and
$T_w$ and $T_a$ are the incremental temperatures of the probe and fluid, respectively, expressed in degrees above a reference temperature $T_0$.

Under steady state conditions q is proportional to the electrical power input to the probe, $I^2 R4$.

Still referring to FIGURE 1, and assuming a battery voltage $E_a$ and bridge unbalance voltage $E_o$ between terminals 18 and 20, $$\frac{E_o}{E_a} = \frac{R1 \times R4 - R2 \times R3}{(R2 + R4)(R1 + R3)} \quad (2)$$

and the dependency of the ratio $$\frac{E_o}{E_a}$$

on the incremental fluid temperature $T_a$ is given by $$\frac{d\left(\frac{E_o}{E_a}\right)}{dT_a} = \left[\frac{\partial\left(\frac{E_o}{E_a}\right)}{\partial R4}\right]_{R3} \times \frac{dR4}{dT_a} + \left[\frac{\partial\left(\frac{E_o}{E_a}\right)}{\partial R3}\right]_{R4} \frac{\partial R3}{\partial T_a} \quad (3)$$

Also $$\left[\frac{\partial\left(\frac{E_o}{E_a}\right)}{\partial R4}\right]_{R3} = \frac{R1 \times R2 + R2 \times R4}{(R1 + R3)(R2 + R4)^2} \quad (4)$$

and $$\left[\frac{\partial\left(\frac{E_o}{E_a}\right)}{\partial R4}\right]_{R4} = -\frac{R1 \times R2 + R2 \times R4}{(R2 + R4)(R1 + R3)^2} \quad (5)$$

Further, $$R3 = R3_0(1 + \alpha_3 T_a) \quad (6)$$

and $$R4 = R4_0(1 + \alpha_4 T_a + \alpha_4(T_w - T_a)) \quad (7)$$

where $R3_0$ and $R4_0$ are the resistances of R3 and R4 when their temperatures are at $T_0$, $\alpha_3$ and $\alpha_4$ are the respective temperature coefficients of resistance, and $(T_w - T_a)$ is the temperature rise of the probe due to electrical heating. We have found that the fluid temperature dependence of U can be neglected over the operational temperature range for accuracies required in most applications, and, therefore, $(T_w - T_a)$ may also be considered independent of $T_a$.

Thus, $$\frac{dR4}{dT_a} = \alpha_4 R4_0 \quad (8)$$

and $$\frac{dR3}{dT_a} = \alpha_3 R3_0 \quad (9)$$

For fluid temperature independence of $$\frac{E_o}{E_a}, \frac{d\left(\frac{E_o}{E_a}\right)}{dT_a} = 0$$

and, substituting (4), (5), (8) and (9) into (3), $$\frac{\alpha_4}{\alpha_3} = \frac{R1}{R2} \times \frac{R3_0}{R4_0} \left(\frac{R2 + R4}{R1 + R3}\right)^2 \quad (10)$$

Assuming the following bridge ratios, $$R1 = cR2$$
$$R3_0 = kR4_0$$
$$R2 = mR4_0$$

and substituting into (10), $$\frac{\alpha_4}{\alpha_3} = ck\left[\frac{(m+1) + \alpha_4(T_a + (T_w - T_a))}{cm + k(1 + \alpha_3 T_a)}\right] \quad (11)$$

As pointed out above, $R_2 \gg R_4$, e.g. $m = 8$.
Therefore, $(m+1) \gg \alpha_4 T_a + [(T_w - T_a)]$. Also $1 \gg \alpha_3 T_a$.

Thus (11) may be approximated by $$\frac{\alpha_4}{\alpha_3} = ck\left[\frac{m+1}{cm+k}\right] \quad (12)$$

In actual practice, we have found it desirable to use platinum wires as the probe resistors, particularly when monitoring air flow. Platinum is relatively inert, has superior aging characteristics and in the case of the heated probe, may be operated continuously at temperatures of up to 750° F. for greater bridge sensitivity. Therefore, the temperature coefficient, $\alpha$, of both the heated and unheated resistance wires will be the same. However, to minimize heating of the unheated probe and maintain the bridge in the neighborhood of balance, R1 and $R3_0$ will be considerably larger than their counterparts R2 and R4. Thus c and k are both much greater than 1. Also, if the bridge is to balance at zero or low mass flow under operating conditions, such balance will occur at a value of R4 considerably greater than $R4_0$. Therefore, the ratio k is greater than the ratio c and $\alpha_4$ is greater than $\alpha_3$.

This result is contrary to what one would ordinarily expect. It would appear that $\alpha_4$ and $\alpha_3$ could be equal, with the bridge in balance. However, Equation 12 shows that $\alpha_4$ equals $\alpha_3$ only if c equals k. This latter condition obtains only if the bridge is balanced at the reference temperature, and, as pointed out above, such is not the case. The derived circuit values are well supported by experiments, wherein we have been able to obtain maximum accuracy in the face of fluid temperature variations by using the values suggested by Equation 12.

FIGURE 2 illustrates a practical embodiment of our mass flow meter in which the voltmeter 16 is seen to include a sensitive current meter 22 in series with a resistor R6. The unheated probe resistor R3 comprises a probe element R7 and a coefficient-reducing resistor R8 in parallel therewith.

More particularly, resistor R7 lowers the temperature coefficient of resistance of resistor R3 below $\alpha_7$, the coefficient of the element R7. Element R7 may thus be of the same material as resistor R4, with $\alpha_7$ equal to $\alpha_4$. The relationship of $\alpha_7$ to $\alpha_3$ is given by $$\frac{\alpha_7}{\alpha_3} = \left[\frac{R7_o}{R8}(1+\alpha T_a)+1\right]^2 \quad (13)$$

which may be approximated by $$\frac{\alpha_7}{\alpha_3} = \left(\frac{R7_o}{R8}+1\right)^2 \quad (14)$$

Equations 14 and 12 define the relationships of all the bridge parameters R1, R2, R4, R7 and R8.

In practice we have found that in a suitable instrument for measurement of air flow, with an input of 18 volts from battery 10, these resistors may have the following values:

R1 _____ 1000 ohms (variable for calibration purposes).
R2 _____ 72.0 ohms.
R4$_o$ _____ 9.0 ohms.
R7$_o$ _____ 90.0 ohms.
R8 _____ 1000.0 ohms (variable for calibration purposes).

Resistor R6 may then be approximately 1000 ohms, a value sufficiently high to prevent unbalance current through meter 22 from appreciably affecting the voltages across the probe resistors R3 and R4. It is preferably a variable resistor in order to facilitate calibration of meter 22. The accuracy of the instrument may be increased by increasing the resistance of resistor R2 to maintain the current through heated resistor R4 more nearly constant. However an increased supply voltage will then be required and the dissipation in resistor R2 substantially increased. The maximum value of this resistor will, therefore, depend on the amount of heat which can be removed from it in the particular installation.

It should be noted that, while the temperature coefficient of resistor R3 is shown modified by a shunt resistor R8, the same objective may be accomplished by a resistor (not shown) in series with the element R7.

In FIGURES 3 and 4, we have illustrated a probe unit containing the sensing resistor R4 and element R7. The unit, generally indicated at 30, has a cover 32 suitably attached to a plate 34, the latter carrying a heated probe generally indicated at 36 and an unheated probe generally indicated at 38. Probe 36 contains resistor R4 and probe 38 contains element R7.

More particularly, probe 38 comprises a tube 40 brazed or welded to an adapter 42 secured in plate 34 by a collar portion 42a working against a nut 44 and lock washer 46. A pair of leads 48 and 50 extends through the probe and support the element R7 in a protective cage 52. As best seen in FIGURE 4, cage 52 is attached to a plug 54 threaded into tube 40. Leads 48 and 50 pass through a ceramic insert 56 in the plug and are welded at their outer ends 48a and 50a to the element R7. The latter is shown as a platinum winding formed on a mica card 58. Tube 40 and adapter 42 are preferably filled with a suitable insulating material such as magnesium oxide.

Probe 36 may take the same construction as probe 38. Thus, as seen in FIGURE 3, a tube 60 is fastened to an adapter 62 and thereby secured to plate 34 by a nut and lock washer, 64 and 66. A pair of leads 68 and 70 extend through tube 60 to support resistor R4, shown as a winding on a mica card 72. A protective cage 74 is mounted on tube 60 by a plug 76.

Plate 34 is suitably secured to a conduit (not shown) with the probes exposed to the fluid stream therein. Probe 36 may extend out into midstream, with probe 38 disposed upstream and not so far out. This arrangement prevents heating of probe 38 by fluid heated by probe 36 and minimizes effects by each probe on air flow past the other. The probe unit 30 may also house resistors R1, R2, and R8, shown schematically in FIGURE 3 as connected to leads 48, 50, 68 and 70, and to a conventional coupling unit generally indicated at 80.

The probe unit 30 operates in the manner described, with the heated resistor R4 cooled by the flow of the monitored fluid around it. Its temperature thus depends on both the temperature and mass flow rate of the fluid. The temperature of the unheated element R7 depends only on fluid temperature and, in the circuit of FIGURE 2, the variations in the resistance of this element are made to compensate for fluid temperature-caused variations in the resistance of the heated resistor.

Thus we have described a simple hot-wire mass flow meter adapted for accurate flow measurement over a wide range of fluid temperature variations. The instrument comprises a bridge circuit containing an unheated and an electrically heated resistor, both of which are exposed to the fluid stream. The circuit parameters are chosen so that the voltage across the unheated resistor undergoes the same variations as the voltage across the heated resistor in response to fluid temperature change, and the bridge unbalance voltage is thus responsive only to mass flow and not to fluid temperature.

The instrument includes passive elements only and is thus more reliable and suitable for field use than others of comparable accuracy heretofore available.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. An instrument for measuring the mass flow of a fluid substance, said instrument comprising, in combination, first and second thermally sensitive electrical resistance elements, a substantially constant current first source connected to pass a substantially constant current through said first element and adapted thereby to increase the temperature thereof, a second current source connected to said second element of insufficient intensity to change the temperature thereof, means for exposing said elements to said substance, whereby the voltage across said first element is a function of the sum of the effects on the temperature of said first element due to the mass flow and the temperature of said substance and the voltage across said second element is substantially a function of the temperature only of said substance and means responsive to the difference between said voltages for indicating mass flow, said voltage responsive means producing an indication which depends substantially only on the component of said voltage across said first element which is a function of mass flow.

2. The combination defined in claim 1 in which the resistances and temperature coefficients of resistance of said elements are such that their voltage variations with fluid temperature changes are substantially the same over the range of operation of said meter.

3. The combination defined in claim 2 in which said second current source is a substantially constant current source.

4. An instrument adapted to measure the mass flow of a fluid substance, said instrument comprising, in combination, a first thermally sensitive resistance element and a first resistor connected in series therewith, a second thermally sensitive resistance element and a second resistor connected in series therewith, means for applying an electrical potential across said first resistor and first element, and also across said second resistor and second element, said resistors having substantially greater resistances than the elements connected in series therewith to maintain substantially constant currents through said elements during variations of the resistances thereof, said first resistor and first element being of such resistances as to heat said first element substantially above the temperature of said substance, said second resistor and second element being of such resistances as substantially not to heat said second element by current through it, means for exposing said elements to said substance, whereby the voltage across said first element is a function of the mass flow and temperature of said fluid and the voltage across said second element is a function substantially only of the temperature of said fluid.

5. The combination defined in claim 4 in which the resistances of said resistors and elements are so proportioned that changes in voltage across said second element are substantially proportional to changes in voltage across said first element due to changes in temperature of said fluid substance.

6. The combination defined in claim 4 in which the resistance of said resistors and elements are so proportioned that the changes in voltage across said second element are substantially equal to the changes in voltage across said first element resulting from change in temperature of said fluid and including means for subtracting the voltage across one of said elements from the voltage across the other of said elements.

7. The combination defined in claim 4 including indicating means adapted to subtract the voltage across one of said elements from the voltage across the other of said elements.

8. The combination defined in claim 4 in which the temperature coefficient of resistance $\alpha_4$ of said first element is substantially given by $$\alpha_4 = \alpha_3 ck \left[ \frac{m+1}{cm+k} \right]^2$$

where $\alpha_3$ is the temperature coefficient of resistance of said second element, $c$ is the ratio of the resistance of said second resistor to that of said first resistor, $k$ is the ratio of resistance of said second element to that of said first element at a reference temperature and $m$ is the ratio of the resistance of said first resistor to that of said first element at said reference temperature.

9. An instrument adapted to measure the mass flow of a fluid substance, said instrument comprising, in combination, a first thermally sensitive resistance element and a first resistor connected in series therewith, a second thermally sensitive resistance element and a second resistor connected in series therewith, means for applying an electrical potential across said first resistor and first element and also across said second resistor and second element, said resistors having substantially greater resistances than the elements connected in series therewith, thereby to maintain substantially constant current through said elements during variations of the resistance thereof, said first resistor and first element being of such resistances as to heat said first element substantially above the temperature of said substance, said second resistor and second element being of such resistances as to maintain said second element at substantially the temperature of said fluid substance, means for exposing said elements to said substance, the temperature coefficient of resistance $\alpha_4$ of said first element being given substantially by $$\alpha_4 = \alpha_3 ck \left[ \frac{m+1}{cm+k} \right]^2$$

where $\alpha_3$ is the temperature coefficient of resistance of said second element, $c$ is the ratio of the resistance of said second resistor to that of said first resistor, $k$ is the ratio of resistance of said second element to that of said first element at a reference temperature and $m$ is the ratio of the resistance of said first resistor to that of said first element at said reference temperature, whereby the voltage across said first element is a function of the mass flow rate and temperature of said substance, the voltage across said second element is a function substantially only of the temperature of said substance, and the difference between the voltages across said elements is a function substantially only of said mass flow rate.

10. The combination defined in claim 9 including indicating means responsive to the difference between the voltages across said elements.

11. An instrument adapted to measure the mass flow of a fluid substance, said instrument comprising, in combination, a first thermally sensitive resistance element and a first resistor connected in series therewith, a second thermally sensitive resistance element and a second resistor connected in series therewith, means for applying a substantially constant electrical potential across the series combination of said first resistor and first element and also across the series combination of said second resistor and second element, said resistors having substantially greater resistances than the elements connected in series therewith so as to maintain substantially constant currents through said elements during variations of the resistances thereof, said first resistor and first element being of such resistances as to heat said first element substantially above the temperature of said substance, said second resistor and second element being of such resistances as substantially not to heat said second element with current through it, means for exposing said elements to said substance, whereby the voltage across said first element is a function of the mass flow and temperature of said fluid and the voltage across said second element is a function substantially only of the temperature of said fluid, the resistances of said resistors and elements being so proportioned that changes in voltage across said second element due to changes in temperature of said fluid substance are substantially proportional to the corresponding changes in voltage across said first element, and indicating means responsive to the difference between the voltages across said elements.

12. The combination defined in claim 11 in which the resistances of said resistors are at least eight times as great as the resistances of the elements connected in series therewith.

References Cited in the file of this patent

UNITED STATES PATENTS

| | | |
|---|---|---|
| 2,650,496 | Middleton et al. | Sept. 1, 1953 |
| 2,726,546 | King | Dec. 13, 1955 |
| 2,800,018 | Phillips et al. | July 23, 1957 |

FOREIGN PATENTS

| | | |
|---|---|---|
| 673,143 | Great Britain | June 4, 1952 |

OTHER REFERENCES

Dryden et al.: The Measurements of Fluctuations of Air Speed by the Hot-Wire Anemometer, N.A.C.A. Report No. 320, pages 359 to 382 (only pages 369 and 370 pertinent). (Copy in Scientific Library.)

UNITED STATES PATENT OFFICE
CERTIFICATE OF CORRECTION

Patent No. 3,068,693                          December 18, 1962

Robert J. Ferran et al.

It is hereby certified that error appears in the above numbered patent requiring correction and that the said Letters Patent should read as corrected below.

Column 3, line 12, for "out" read -- our --; lines 58 and 59, for $$\frac{E_o}{E_o} \quad \text{read} \quad \frac{E_o}{E_a}$$

same column 3, lines 62 to 65, the left-hand portion of formula (3) should appear as shown below instead of as in the patent:

$$\frac{d\left(\frac{E_o}{E_a}\right)}{dT_a} =$$

column 4, lines 23 to 26, strike out "$\frac{E_o}{E}$," and insert the same after "of", in line 22, same column 4; same column 4, lines 23 to 26, the numerator appearing on the right side of the equation should appear as shown below instead of as in the patent:

$$d\left(\frac{E_o}{E_a}\right)$$

3,068,693 same column 4, lines 43 to 45, for that portion of the equation reading:

$$\begin{bmatrix} m+1 \\ cm+k \end{bmatrix} \quad \text{read} \quad \begin{bmatrix} m+1 \\ cm+k \end{bmatrix}^2$$

Signed and sealed this 24th day of August 1965.

(SEAL)
Attest:

ERNEST W. SWIDER
Attesting Officer

EDWARD J. BRENNER
Commissioner of Paten